(12) United States Patent
Wei et al.

(10) Patent No.: US 9,505,429 B2
(45) Date of Patent: Nov. 29, 2016

(54) ELECTRIC POWER STEERING APPARATUS

(71) Applicant: NSK Ltd., Shinagawa-ku, Tokyo (JP)

(72) Inventors: Yong Wei, Gunma (JP); Masahiro Maeda, Gunma (JP)

(73) Assignee: NSK Ltd., Tokyo (JP)

( * ) Notice: Subject to any disclaimer, the term of this patent is extended or adjusted under 35 U.S.C. 154(b) by 29 days.

(21) Appl. No.: 14/443,783

(22) PCT Filed: Sep. 30, 2014

(86) PCT No.: PCT/JP2014/005000
§ 371 (c)(1),
(2) Date: May 19, 2015

(87) PCT Pub. No.: WO2015/049861
PCT Pub. Date: Apr. 9, 2015

(65) Prior Publication Data
US 2016/0280256 A1  Sep. 29, 2016

(30) Foreign Application Priority Data
Oct. 1, 2013  (JP) ................................ 2013-206420

(51) Int. Cl.
*B62D 6/00* (2006.01)
*B62D 5/04* (2006.01)

(52) U.S. Cl.
CPC ........... *B62D 5/0469* (2013.01); *B62D 5/0409* (2013.01)

(58) Field of Classification Search
CPC .. B62D 5/0469; B62D 5/0409; B62D 13/00; B62D 19/00
See application file for complete search history.

(56) References Cited

U.S. PATENT DOCUMENTS

| 2003/0045981 A1 | 3/2003 | Kifuku et al. |
| 2013/0013154 A1* | 1/2013 | Aoki ...................... B62D 5/046 701/42 |
| 2014/0046548 A1* | 2/2014 | Mukai ...................... B62D 6/00 701/42 |

FOREIGN PATENT DOCUMENTS

| JP | 2001-30933 A | 2/2001 |
| JP | 2007-223456 A | 9/2007 |
| JP | 4132439 B2 | 8/2008 |
| JP | 2008-284889 A | 11/2008 |

(Continued)

OTHER PUBLICATIONS

Japanese language Written Opinion (PCT/ISA/237) dated Jan. 13, 2015, with English translation (Six (6) pages).
International Search Report (PCT/ISA/210) dated Jan. 13, 2015, with English translation (Four (4) pages).

(Continued)

*Primary Examiner* — Richard Camby
(74) *Attorney, Agent, or Firm* — Crowell & Moring LLP

(57) ABSTRACT

There is provided an electric power steering apparatus capable of alleviating an impact force at the time of an end contact, while giving natural and smooth steering feeling to a driver without degrading the steering feeling. When steering angle (θs) is equal to or larger than a limit starting steering angle (θst), a voltage target value (Vt) of an electric motor (13) is limited, and an upper limit (current limiting value I_Lim) of a current command value (Iref) is set based on the limited voltage target value (Vt) and the motor rotation speed (N) by use of a motor output characteristic of the electric motor (13). Then, the electric motor (13) is driven and controlled based on a current command value (Iref_Lim) that has been limited with the current command value (I_Lim).

9 Claims, 7 Drawing Sheets

(56) References Cited

FOREIGN PATENT DOCUMENTS

| | | |
|---|---|---|
| JP | 2008-308002 A | 12/2008 |
| JP | 2009-29285 A | 2/2009 |

OTHER PUBLICATIONS

Extended European Search Report issued in counterpart European Application No. 14850142.2 dated Jul. 20, 2016 (Six (6) pages).

* cited by examiner

ELECTRIC POWER STEERING APPARATUS

TECHNICAL FIELD

The present disclosure relates to an electric power steering apparatus including an electric motor that generates steering assisting torque given to a steering mechanism, more particularly to an electric power steering apparatus to alleviate an impact at the time of an end contact.

BACKGROUND ART

Electric power steering apparatuses are common, which give a steering assist force to a steering mechanism by driving an electric motor in accordance with the steering torque of a steering wheel steered by a driver.

In the steering mechanism, when the steering wheel is continuously steered left or right from its neutral position and a manipulation amount of the steering wheel reaches its maximum steering angle corresponding to the maximum manipulation amount, the steering wheel reaches its steering limit in which a further steering manipulation cannot be performed because the steering mechanism is brought into contact with a mechanical stopper. Such a state of reaching the steering limit in which the steering mechanism is brought into contact with the mechanical stopper is called end contact.

When a steering wheel is manipulated quickly, i.e., when the steering speed is high, the steering assist force generated at the electric power steering apparatus also increases, meaning that an impact force generated at the time of the end contact also becomes large. This may result in deterioration in durability of the steering mechanism or may give a driver uncomfortable feeling during manipulation of the steering wheel.

Then, Patent Literature 1, for example, describes a technique for an electric power steering apparatus to alleviate the impact at the time of an end contact. In this technique, when the steering wheel approaches a predetermined maximum steering angle and exceeds an attenuation starting steering angle is detected, the driving force of the electric motor is attenuated. In this technique, the attenuation starting steering angle is set in accordance with the load of the steering wheel and the steering speed of the steering wheel.

CITATION LIST

Patent Literature

PTL 1: JP Patent Number 4132439

SUMMARY

Technical Problem

In the technique described in PTL 1 as stated above, the attenuation starting steering angle is set in accordance with the load of the steering wheel and the steering speed of the steering wheel. When the steering speed is high, a difference between the maximum steering angle and the attenuation starting angle is increased (advancing the timing of attenuating the driving force of the electric motor), so as to prevent a large impact, which occurs at the time of the end contact due to the inertia of the motor.

In this case, however, it is difficult for the driver to manipulate the wheel to the maximum steering angle because of the shortage of the steering assist force in the vicinity of the maximum steering angle. Additionally, when the steering wheel returns from the vicinity of the maximum steering angle to the neutral position, the steering assist force becomes insufficient due to an attenuation of the driving force of the electric motor, which may give the driver a feeling such that the steering wheel sticks to the vicinity of the maximum steering angle and degrade the feeling of the steering.

Therefore, the present disclosure aims to provide an electric power steering apparatus capable of alleviating an impact force at the time of an end contact, while giving a natural and smooth steering feeling to the driver without degrading the steering feeling.

Solution to Problem

In order to address the above-stated issues, an electric power steering apparatus in one embodiment according to the present disclosure includes a steering torque detection unit configured to detect steering torque to be input to a steering mechanism; a current command value calculation unit configured to calculate a current command value based on at least the steering torque detected by the steering torque detection unit; an electric motor configured to generate steering assist torque to be given to a steering shaft of the steering mechanism; a motor control unit configured to drive and control the electric motor based on the current command value; a steering angle detection unit configured to detect a steering angle of a steering wheel; a voltage target value setting unit configured to set a voltage target value of the electric motor based on the steering angle detected by the steering angle detection unit; a motor rotation speed detection unit configured to detect a motor rotation speed of the electric motor; and a current limiting value setting unit configured to set a limiting value of the current command value calculated by the current command value calculation unit by using the voltage target value set by the voltage target value setting unit and the motor rotation speed detected by the motor rotation speed detection unit, based on a motor output characteristic of the electric motor, wherein the motor control unit is configured to drive and control the electric motor based on the current command value obtained by limiting the current command value calculated by the current command value calculation unit to the limiting value set by the current limiting value setting unit as an upper limit.

In this way, a voltage target value is set in accordance with the steering angle of the electric motor, so that the output characteristic of the electric motor can be set in accordance with the steering angle. Then, an upper limit value of a current command value for steering assist control is set by using the motor output characteristic that has been set. Accordingly, the maximum current value flowing through the electric motor can be set in accordance with the steering angle, so desired steering feeling is achievable. Thus, an impact force at the time of an end contact can be alleviated, or shortage of assist in the vicinity of the maximum steering angle can be suppressed, so as to improve the steering feeling.

In the above-described electric power steering apparatus, in one embodiment, when the steering angle detected by the steering angle detection unit is equal to or larger than a preset limit starting steering angle, the voltage target value setting unit may be configured to decrease and correct the voltage target value as compared with a case where the steering angle detected by the steering angle detection unit is smaller than the limit starting steering angle.

Therefore, the output of the electric motor can be limited with certainty, when the steering angle is equal to or larger than the limit starting steering angle. It is thus possible to alleviate the impact force transmitted to the torque transmission member, such as an intermediate shaft, at the time of an end contact, so that durability of the steering mechanism can be kept. Hence, the driver's uncomfortable feeling can be suppressed during the steering manipulation.

In the above-described electric power steering apparatus, in one embodiment, when the steering angle detected by the steering angle detection unit is equal to or larger than the limit starting steering angle, the voltage target value setting unit may be configured to decrease and correct the voltage target value from a preset maximum voltage value toward a preset minimum voltage value based on the motor output characteristic, as the steering angle detected by the steering angle detection unit gets closer to a maximum steering angle that is a steering limit angle of the steering wheel.

In this way, as the steering angle gets closer to the maximum steering angle, a smaller value is set for the voltage target value of the electric motor. Therefore, as the steering angle gets closer to the maximum steering angle, the assist force can be limited to be smaller. Accordingly, the impact force can be alleviated at the time of an end contact more effectively. Since the minimum voltage value for the electric motor is set based on the motor output characteristic, the minimum assist force demanded for driver's manipulation of the wheel to the rack end can be kept, so that a smooth steering feeling can be achieved.

In one embodiment, the above-described electric power steering apparatus may further include an additional steering manipulation detection unit configured to detect an additional steering manipulation of the steering wheel manipulated by a driver, wherein when the additional steering manipulation detection unit detects the additional steering manipulation of the steering wheel manipulated by the driver and the steering angle detected by the steering angle detection unit is equal to or larger than the limit starting steering angle, the voltage target value setting unit is configured to decrease and correct the voltage target value as compared with a case where the steering angle detected by the steering angle detection unit is smaller than the limit starting steering angle.

In this way, the voltage for the electric motor is limited to limit the motor output only during the additional steering manipulation. Accordingly, it is possible to prevent shortage of the steering assist powder when the driver returns the steering wheel from the vicinity of the maximum steering angle to the neutral position. It is thus possible to avoid the driver's feeling during such returning manipulation such that the steering wheel sticks to the vicinity of the maximum steering angle so as to avoid degradation of the feeling of the steering.

In one embodiment, the above-described electric power steering apparatus may further include a steering angular speed detection unit configured to detect a steering angular speed of the steering wheel, wherein as the steering angular speed detected by the steering angular speed detection unit is faster, the voltage target value setting unit is configured to increase a decreasing correction amount of decreasing the voltage target value. In this way, voltage limiting for the electric motor is increased with the steering angular speed, so as to limit the motor output during high-speed steering and to weak the impact force at the time of an end contact. Thus, it is possible to keep the steering assist force during the low-speed steering.

In one embodiment, the above apparatus may further include a steering angular acceleration detection unit configured to detect steering angular acceleration of the steering wheel, wherein as the steering angular acceleration detected by the steering angular acceleration detection unit is larger, the voltage target value setting unit is configured to increase a decreasing correction amount of decreasing the voltage target value. In this way, since the voltage for the electric motor is limited to increase, as the steering angular acceleration is larger, the motor output for sudden switching steering in the vicinity of rack end can be also limited appropriately.

In the above-described electric power steering apparatus, in one embodiment, as the steering torque detected by the steering torque detection unit is smaller, the voltage target value setting unit may be configured to increase a decreasing correction amount of decreasing the voltage target value. In this way, the voltage for the electric motor is limited to be increased with a decrease in the steering torque. Accordingly, even when the motor output for a small steering force due to the load of the vehicle or the state of the road surface $\mu$, for example, it is possible to reduce an impact force at the time of an end contact.

In one embodiment, the above-described electric power steering apparatus may further include a vehicle-speed detection unit configured to detect a vehicle speed of a vehicle, wherein when the vehicle speed detected by the vehicle-speed detection unit falls below a preset high vehicle-speed area determination vehicle speed, as the vehicle speed is higher, the voltage target value setting unit is configured to change a decreasing correction amount of decreasing the voltage target value to be smaller, and when the vehicle speed detected by the vehicle-speed detection unit is equal to or higher than the high vehicle-speed area determination vehicle speed, the voltage target value setting unit is configured to change the decreasing correction amount of decreasing the voltage target value to zero. In this way, the voltage for the electric motor is not limited when the vehicle speed is in the high-vehicle speed area. Accordingly, it is possible to prevent an influence on emergency avoidance or the like.

In one embodiment, in the above-described electric power steering apparatus, the current limiting value setting unit may be configured to calculate, from an operating point on a motor output characteristic line obtained by setting the voltage value of the electric motor constant at the voltage target value set by the voltage target value setting unit, a motor current value when the motor rotation speed equals the motor rotation speed detected by the motor rotation speed detection unit, and to set the motor current value that has been calculated as a limiting value of the current command value.

In this way, the limiting value of the current command value in the steering assist control is set based on the motor output characteristic specified from the voltage target value of the electric motor and the motor rotation speed. Therefore, a natural and smooth steering feeling can be achieved.

Advantageous Effects

According to the present disclosure, an upper limit value of the current flowing through an electric motor can be set by using a motor output characteristic. Hence, it is possible to alleviate an impact force transmitted to the torque transmission member, such as an intermediate shaft, at the steering limit position at the time of an end contact, while giving natural and smooth steering feeling to a driver without degrading the steering feeling.

DESCRIPTION OF EMBODIMENTS

Embodiments of the present disclosure will now be described with reference to the drawings.

Embodiment 1

Figure 1:
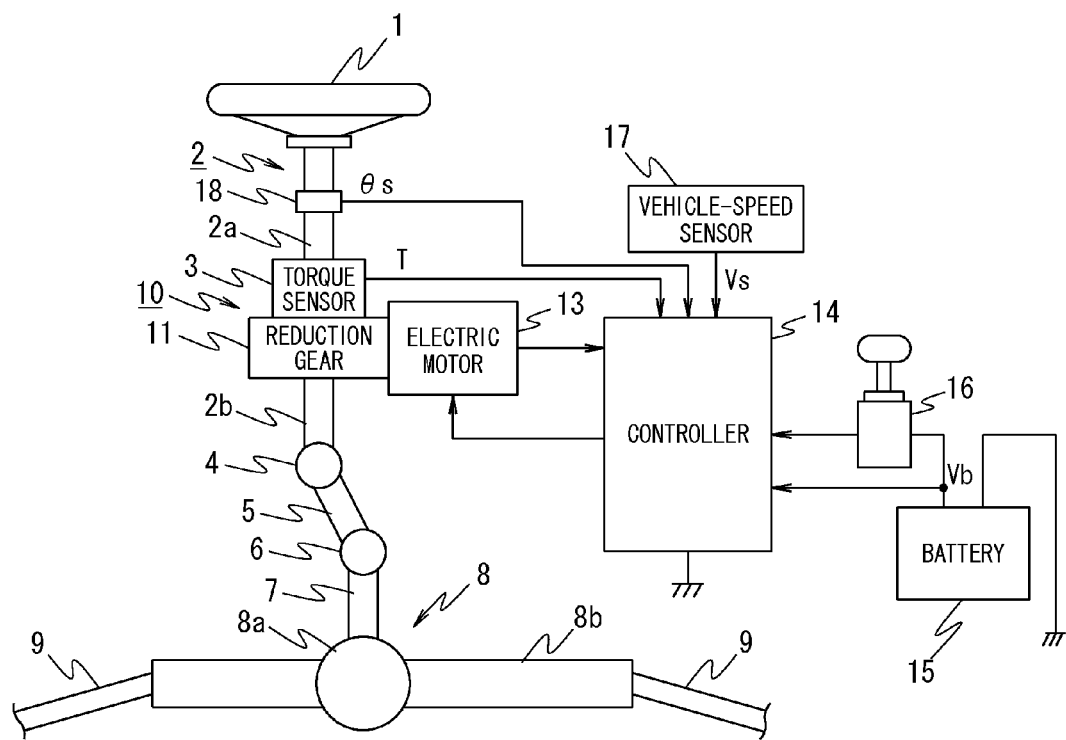
FIG. 1 is an overall configuration view illustrative of an electric power steering apparatus in one embodiment of the present disclosure.

FIG. 1 illustrates the overall configuration illustrative of an electric power steering apparatus according to the present disclosure.

In the drawing, reference numeral 1 denotes a steering wheel of a vehicle, and steering force acting on this steering wheel 1 through the action of a driver is transmitted to a steering shaft 2. This steering shaft 2 has an input shaft 2a and an output shaft 2b, where the input shaft 2a has one end jointed to the steering wheel 1 and the other end jointed to one end of the output shaft 2b via a steering torque sensor 3.

Then, the steering force transmitted to the output shaft 2b is transmitted to an intermediate shaft 5 via a universal joint 4, and is then transmitted to a pinion shaft 7 via a universal joint 6. The steering force transmitted to this pinion shaft 7 is transmitted to tie rods 9 via a steering gear 8, and turn the turning wheels, not illustrated. The steering gear 8 is in the form of a rack-and-pinion structure having a pinion 8a jointed to the pinion shaft 7 and racks 8b meshing with the pinion 8a, and transforms rotational movement transmitted to the pinion 8a into translatory movement by the racks 8b.

The output shaft 2b of the steering shaft 2 is joined to a steering assist mechanism 10 that transmits steering assist force to the output shaft 2b. This steering assist mechanism 10 includes a reduction gear 11 joined to the output shaft 2b and an electric motor 13 that is joined to this reduction gear 11, and generates steering assist force for the steering system.

The steering torque sensor 3 is configured to detect steering torque given to the steering wheel 1 and transmitted to the input shaft 2a. The steering torque sensor 3, for example, is configured to transform the steering torque into a helix angle displacement of a torsion bar, not illustrated, that is interposed between the input shaft 2a and the output shaft 2b, detect twisted angle displacement with a magnetic signal, and convert it into an electrical signal. The steering torque T detected by this steering torque sensor 3 is input to a controller 14.

The controller 14 is configured to operate when receiving power supplied from a battery 15 that is a vehicle-mounted power supply. The cathode of the battery 15 is grounded, and the anode is connected to the controller 14 via an ignition switch 16 that activates the engine, and is connected directly to the controller 14 without the ignition switch 16 between them.

The controller 14 receives, as an input, a vehicle speed Vs detected by a vehicle-speed sensor 17 and a steering angle θs detected by a steering angle sensor 18, in addition to the steering torque T. Then, the controller performs steering assist control (steering assist) to give the steering assist force corresponding to them to the steering system. Specifically, a steering assist command value (steering assist torque command value) to generate the steering assist force at the electric motor 13 is calculated by a known procedure, and a current command value for the electric motor 13 is calculated based on the calculated steering assist command value. Then, driving current to be supplied to the electric motor 13 is feedback controlled based on the calculated current command value and the motor current detection value.

Next, the following describes a specific configuration of the controller 14.

Figure 2:
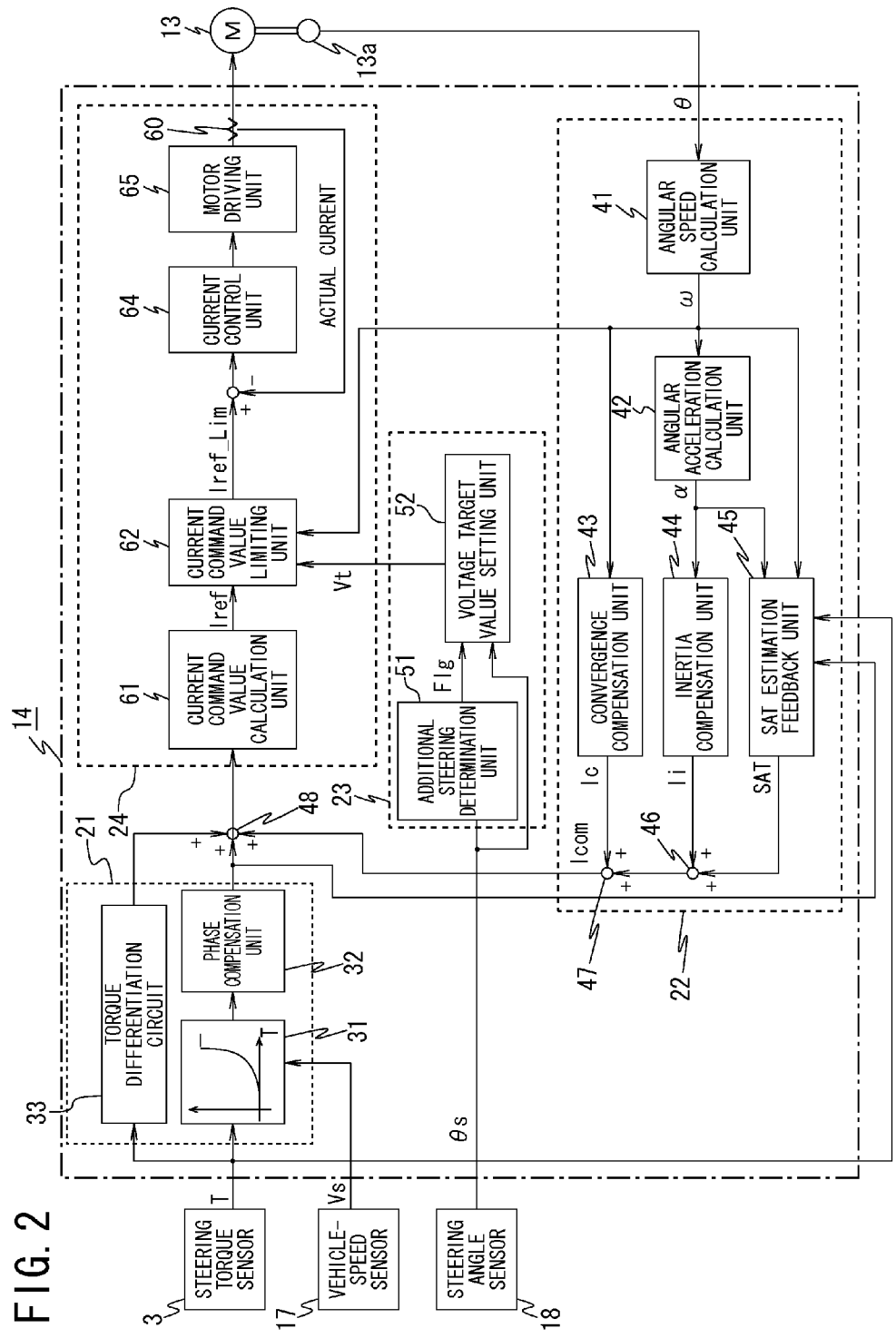
FIG. 2 is a block diagram illustrative of a specific configuration of a controller.

As illustrated in FIG. 2, the controller 14 includes a command value calculation unit 21 configured to calculate a steering assist command value (steering assist torque command value) based on steering torque T and vehicle speed Vs, a command value compensation unit 22 configured to compensate for a steering assist command value, a voltage limiting unit 23 configured to set a voltage target value Vt to limit the voltage of the electric motor 13 based on the steering angle θs, and a motor control unit 24 configured to drive and control the electric motor 13 based on the steering assist command value compensated at the command value compensation unit 22.

The command value calculation unit 21 includes a steering assist command value calculation unit 31, a phase compensation unit 32, and a torque differentiation circuit 33.

The steering assist command value calculation unit 31 is configured to calculate a steering assist command value (steering assist torque command value) while referring to a steering assist command value calculation map based on the steering torque T and vehicle speed Vs. The steering assist command value calculation map represents the steering torque T in the horizontal axis and the steering assist command value in the vertical axis, which is in the form of characteristic lines including the vehicle speed Vs as a parameter. The steering assist command value is set so as to firstly increase relatively gently with reference to an increase in the steering torque T. As the steering torque T further increases, the steering assist command value steeply increases with reference to such an increase. The characteristic lines have a gradient that decreases with an increase in the vehicle speed Vs. Each characteristic line has an upper limit.

The phase compensation unit 32 is configured to perform phase compensation for the steering assist command value calculated at the steering assist command value calculation unit 31, and to output the steering assist command value subjected to the phase compensation to an adder 48. Herein, a transmission property as in $(T_1s+1)/(T_2s+1)$ is configured to act on the steering assist command value.

The torque differentiation circuit 33 is configured to calculate a compensation value for the steering torque T based on a change ratio of the steering torque that is obtained by differentiating the steering torque T, and to output it to the adder 48.

The command value compensation unit 22 at least includes an angular speed calculation unit 41, an angular acceleration calculation unit 42, a convergence compensation unit 43, an inertia compensation unit 44, and a SAT estimation feedback unit 45.

The angular speed calculation unit 41 is configured to differentiate the angle θ of rotation of the motor that is detected at a rotation angle detection sensor 13a to calculate a motor angular speed ω. The angular acceleration calculation unit 42 is configured to differentiate the motor angular speed ω calculated at the angular speed calculation unit 41 to calculate a motor angular acceleration α.

The convergence compensation unit 43 is configured to receive, as an input, the motor angular speed ω calculated at the angular speed calculation unit 41, and to calculate a convergence compensation value Ic so as to apply a brake to the swinging and rotating action of the steering wheel 1 to improve the convergence in yaw of the vehicle.

The inertia compensation unit 44 is configured to compensate for the amount corresponding to the torque generated from inertia of the electric motor 13 and to calculate an inertia compensation value Ii to prevent deterioration in the feeling of inertia or control responsiveness.

The SAT estimation feedback unit 45 is configured to receive, as an input, the steering torque T, the motor angular speed ω, the motor angular acceleration α, and the steering assist command value calculated at the command value calculation unit 21, and to estimate and calculate self-aligning torque SAT based on them.

Then, an adder 46 is configured to add the inertia compensation value Ii calculated at the inertia compensation unit 44 and the self-aligning torque SAT calculated at the SAT estimation feedback unit 45, and to output the result to an adder 47.

The adder 47 is configured to add a result of the addition at the adder 46 and the convergence compensation value Ic calculated at the convergence compensation unit 43, and to output the result to the adder 48 as a command compensation value Icom.

The adder 48 is configured to add the compensation value output from the torque differentiation circuit 33 and the command compensation value Icom output from the command value compensation unit 22 to the steering assist command value subjected to phase compensation that is output from the phase compensation unit 32, and to output the steering assist command value subjected to compensation. This steering assist command value subjected to compensation is input to the motor control unit 24.

The voltage limiting unit 23 further includes an additional steering determination unit 51 and a voltage target value setting unit 52.

The additional steering determination unit 51 is configured to receive, as an input, the steering angle θs to determine whether the driver manipulates the steering wheel 1 in an additional steering manner or not. Firstly, the additional steering determination unit 51 is configured to calculate the steering angular speed ωs based on the steering angle θs. Then when the steering angle θs and the steering angular speed ωs are of the same sign, it is determined that the driver manipulates the steering wheel 1 in an additional steering manner, and an additional steering determination flag Flg=1 is output to the voltage target value setting unit 52. On the other hand, when the steering angle θs and the steering angular speed ωs are of different signs, it is determined that the driver manipulates the steering wheel 1 in a returning steering manner, and an additional steering determination flag Flg=0 is output to the voltage target value setting unit 52.

The voltage target value setting unit 52 is configured to receive, as an input, the additional steering determination flag Flg and the steering angle θs, and to set a voltage target value (voltage limiting value) Vt for the electric motor 13 based on them. Herein, when it is determined as the driver performing returning steering manipulation (Flg=0), voltage limiting is not performed for the electric motor 13, so that the voltage target value Vt is always set at the battery voltage Vbatt that is the maximum voltage value.

On the other hand, when it is determined as the driver performing additional steering manipulation (Flg=1), the voltage is to be limited for the electric motor 13 in the area where the steering angle θs is a preset limit starting steering angle θst or more (hereinafter, referred to as voltage limiting area), and the voltage target value Vt is set to a value smaller than the battery voltage Vbatt (decreasing correction with reference to the battery voltage Vbatt) in the area.

Figure 3:
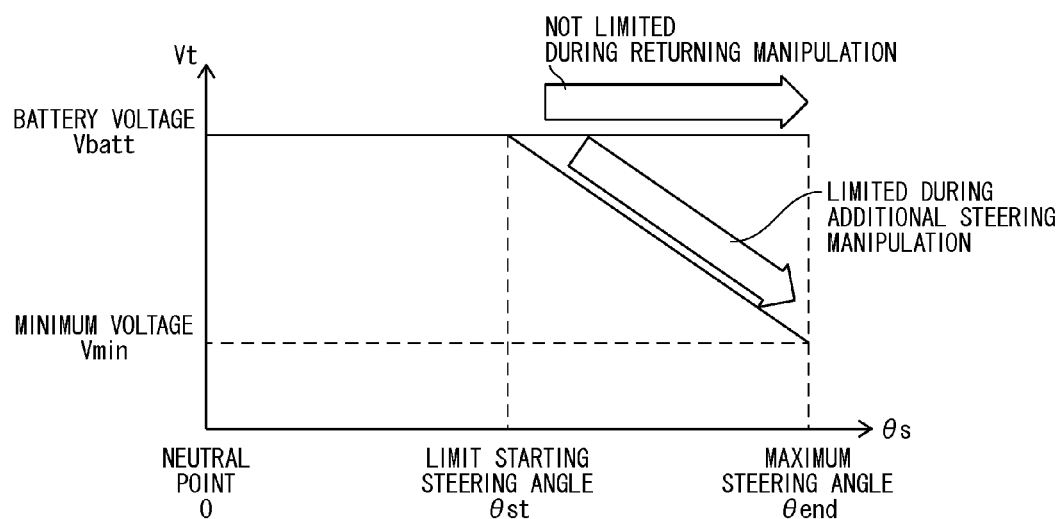
FIG. 3 is a voltage target value setting map.

Specifically, as illustrated in FIG. 3, during the returning steering manipulation (Flg=0), the voltage target value Vt is always set at the battery voltage Vbatt irrespective of the steering angle θs. In the case of during the additional steering manipulation (Flg=1) and where 0≤θs<θst is also satisfied, the voltage target value Vt is set at the battery voltage Vbatt.

Then, in the case of during the additional steering manipulation (Flg=1) and where θst≤θs<θend is satisfied, the voltage target value Vt is set to linearly decrease from the battery voltage Vbatt to the minimum voltage Vmin, as the steering angle θs increases. Herein, the above-stated θend is the maximum steering angle until which the driver can steer the wheel, corresponding to the rack end angle.

The minimum voltage Vmin is set at a motor voltage value, allowing the driver to steer the wheel to the rack end. That is, the minimum voltage Vmin is set at the motor voltage value to keep the minimum assist force at the maximum steering angle, which is preset on the basis of the motor output characteristics of the electric motor 13.

The voltage target value setting unit 52 is configured to output the thus set voltage target value Vt to a current command value limiting unit 62 of the motor control unit 24.

The motor control unit 24 includes a current detector 60 configured to detect actual current at the electric motor 13, a current command value calculation unit 61, the current command value limiting unit 62, a subtracter 63, a current control unit 64 and a motor driving unit 65.

The current command value calculation unit 61 is configured to calculate a current command value Iref for the electric motor 13 from the steering assist command value (steering assist torque command value) output from the adder 48.

The current command value limiting unit 62 is configured to limit the current command value Iref calculated at the current command value calculation unit 61 while setting a current limiting value I_Lim to be described later as the upper limit, and to output the limited current command value as a limited current command value Iref_Lim. Herein, the current limiting value I_Lim is set based on the voltage target value Vt set at the voltage target value setting unit 52 and the motor rotation speed N calculated from the motor angular speed ω, by using the motor output characteristics.

Figure 4:
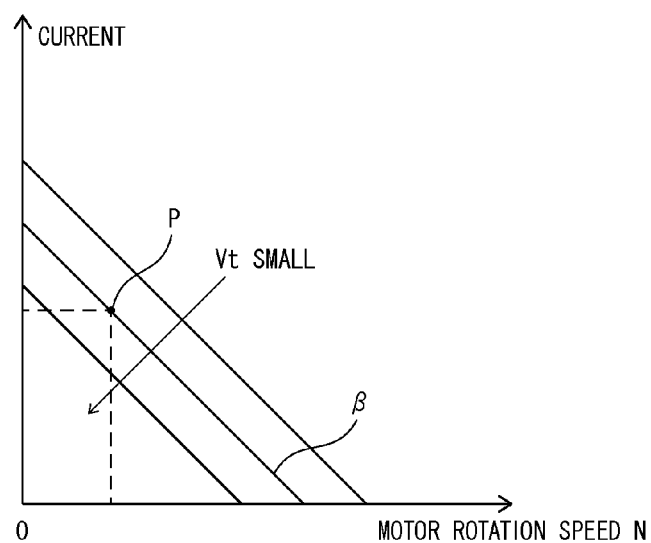
FIG. 4 is a view illustrative of output characteristics of an electric motor.

FIG. 4 is a view illustrative of output characteristics of the electric motor 13. As illustrated in FIG. 4, the electric motor 13 has the characteristics such that, when voltage is constant, the motor current decreases and the assist torque decreases with an increase in the motor rotation speed N. As the voltage decreases, the motor output characteristic lines change in the direction of the arrow in FIG. 4.

In the present embodiment, based on the motor output characteristics in FIG. 4, the motor output characteristic line is defined when the voltage is set constant at the voltage target value Vt set at the voltage target value setting unit 52, and the maximum current (current limiting value I_Lim) for the electric motor 13 is set based on the motor output characteristic line and the motor rotation speed N.

For instance, when the motor output characteristic line is β in FIG. 4 when the voltage is set constant at the voltage target value Vt set by the voltage target value setting unit 52, and then the operating point P is calculated on the motor output characteristic line β, which yields the motor rotation speed N obtained from the motor angular speed ω calculated by the angular speed calculation unit 41. Then, the motor current value at this operating point P is set as the current limiting value I_Lim.

The subtracter 63 is configured to calculate current deviation between the limited current command value Iref_Lim output from the current command value limiting unit 62 and the motor current detection value (actual current) detected by the current detector 60, and to output this to the current control unit 64.

The current control unit 64 is configured to perform a proportional integral (PI) operation to the current deviation, and to output a voltage command value for feedback control.

The motor driving unit 65 is configured to perform a duty operation based on the voltage command value output from the current control unit 64, and to calculate a duty ratio that is a driving command for the electric motor 13. Then, the electric motor 13 is driven based on the duty ratio.

That is, the processing executed by the voltage target value setting unit 52 and the current command value limiting unit 62 in the present embodiment will be summarized as follows.

Figure 5:
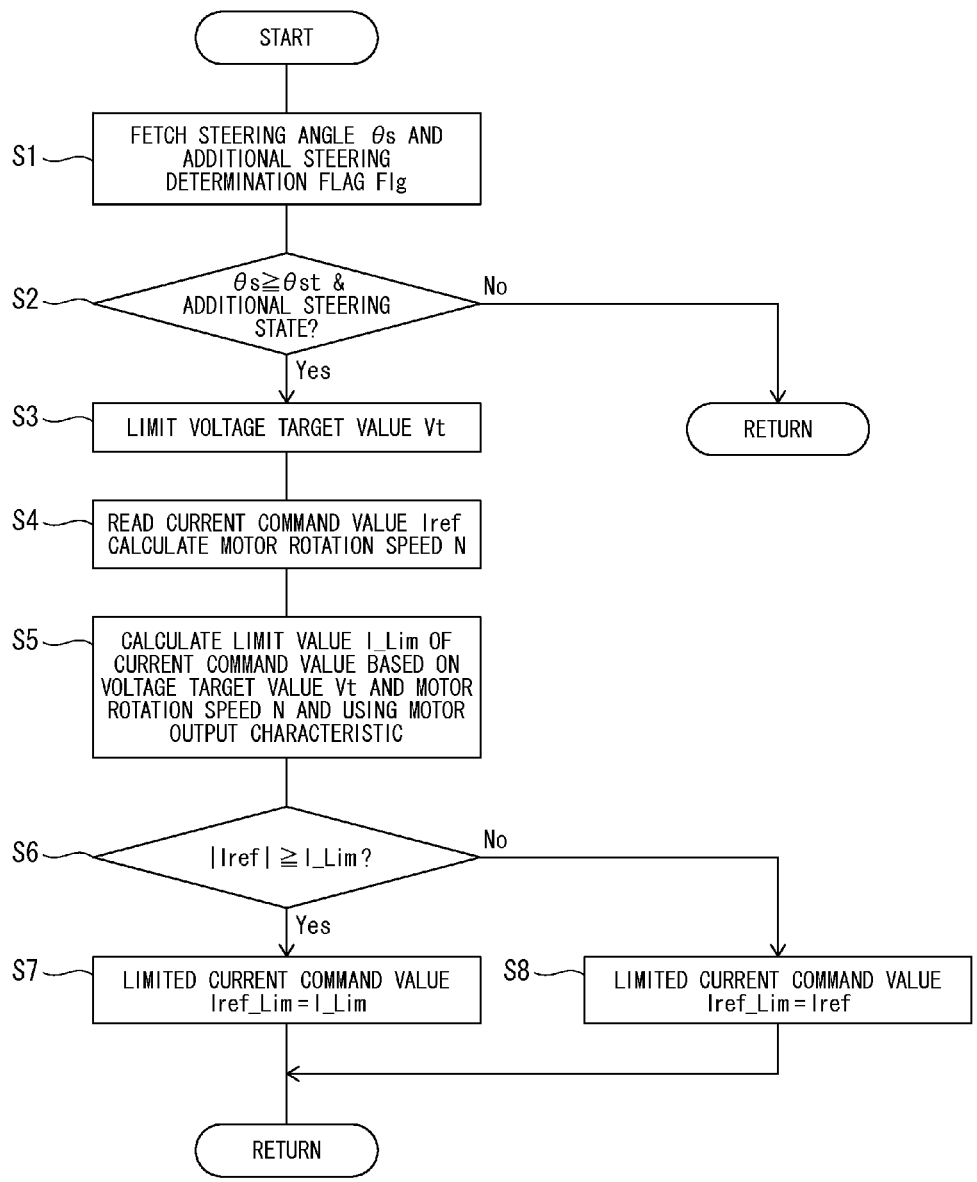
FIG. 5 is a flowchart illustrative of a current command value limiting processing procedure executed by a voltage target value setting unit and a current command value limiting unit.

FIG. 5 is a flowchart illustrative of a voltage limiting processing procedure (current command value limiting processing procedure) executed by the voltage target value setting unit 52 and the current command value limiting unit 62.

Firstly, at step S1, the voltage target value setting unit 52 reads the steering angle θs from the steering angle sensor 18, and reads an additional steering determination flag Flg from the additional steering determination unit 51, and the procedure goes to step S2.

At step S2, the voltage target value setting unit 52 determines whether the steering angle θs read at the step S1 is the limit starting steering angle θst or more and whether or not the additional steering determination flag Flg read at the step S1 is "1", indicating the additional steering manipulation. Then, in the case of θs≥θst and Flg=1, the procedure goes to S3. In other cases, it is determined not to perform voltage limiting, and the voltage limiting processing ends.

At step S3, the voltage target value setting unit 52 limits the voltage target value Vt by using the voltage target value setting map illustrated in FIG. 3 as stated above, based on the steering angle θs read at the step S1. That is, the voltage target value Vt is corrected to decrease to be smaller than the battery voltage Vbatt.

Next at step S4, the current command value limiting unit 62 reads the current command value Iref from the current command value calculation unit 61, and reads the motor angular speed ω from the angular speed calculation unit 41. Then, the current command value limiting unit calculates the motor rotation speed N based on the motor angular speed ω that has been read.

Next at step S5, the current command value limiting unit 62 calculates the motor output characteristic line based on FIG. 4 illustrating the motor output characteristics as stated above when the voltage is made constant at the voltage target value Vt limited at the step S3. Then, based on the motor output characteristic line and the motor rotation speed N calculated at the step S4, the current limiting value I_Lim is set.

At step S6, the current command value limiting unit 62 compares the absolute value of the current command value Iref read at the step S4 with the current limiting value I_Lim set at the step S5. Then, in the case of |Iref|≥I_Lim, then the procedure goes to step S7, and in the case of |Iref|<I_Lim, the procedure goes to step S8.

At step S7, the current command value limiting unit 62 sets the current limiting value I_Lim to the limited current command value Iref_Lim, and then ends the current command value limiting processing.

At step S8, the current command value limiting unit 62 sets the current command value Iref to the limited current command value Iref_Lim, and then ends the current command value limiting processing.

Note here that, in FIG. 1, the steering torque sensor 3 corresponds to a steering torque detection unit, the vehicle-speed sensor 17 corresponds to a vehicle-speed detection unit, and the steering angle sensor 18 corresponds to a steering angle detection unit. In FIG. 2, the command value calculation unit 21 corresponds to a current command value calculation unit, and the subtracter 63, the current control unit 64 and the motor driving unit 65 correspond to a motor control unit.

Then the additional steering determination unit 51 corresponds to an additional steering manipulation detection unit, and the voltage target value setting unit 52 corresponds to a voltage target value setting unit. Then step S4 in FIG. 5 corresponds to a motor rotation speed detection unit, and step S5 corresponds to a current limiting value setting unit.

Next, the action in the present embodiment will be described.

When a driver turns the ignition switch 16 ON, control power is supplied from the battery 15 to the controller 14, and then the controller 14 becomes activated. At this time, the controller 14 performs steering assist control based on the steering manipulation by the driver.

For instance, when the driver starts the vehicle to move and travel while turning along a curved road, then the controller 14 calculates a steering assist command value based on the steering torque T and the vehicle speed Vs, and calculates a current command value Iref for the electric motor 13 based on the steering assist command value.

At this time, when the driver manipulates the steering wheel 1 in an additional steering manner but the steering angle θs does not reach the limit starting steering angle θst, the controller 14 sets the voltage target value Vt for the electric motor 13 at the battery voltage Vbatt that is the maximum voltage. That is, voltage limiting is not performed.

Accordingly, the current limiting value I_Lim to limit the current command value Iref is a value that is set based on the motor output characteristic line obtained by setting the voltage of the electric motor 13 at the maximum voltage (battery voltage Vbatt) and the motor rotation speed N.

Then, normal limiting processing is performed to limit the current command value Iref by using the current limiting value I_Lim that has been thus set, and the electric motor 13 is rotary-driven based on the limited current command value Iref_Lim.

As a result, the electric motor 13 generates steering assist torque in accordance with the steering torque t and the vehicle speed Vs, and the steering assist torque is then transmitted to the output shaft 2b of the steering shaft 2 via the reduction gear 11. This can alleviate the steering load on the driver.

Then, from the state of such normal steering assist control, the driver further manipulates the steering wheel 1 in an additional steering manner. When the steering angle $\theta s$ is equal to or larger than the limit starting steering angle $\theta st$, the controller 14 corrects the voltage target value Vt of the electric motor 13 to decrease with respect to the battery voltage Vbatt. That is, the voltage is limited. At this time, the voltage target value Vt is set so that as the steering angle $\theta s$ approaches the maximum steering angle (rack end angle) $\theta end$, the voltage target value Vt gets closer to the minimum voltage Vmin.

In this case, the current limiting value I_Lim is a value that is set based on the motor output characteristic line obtained by limiting the voltage of the electric motor 13 at a voltage target value Vt that is smaller than the battery voltage Vbatt and the motor rotation speed N. The current limiting value I_Lim at this time is a value smaller than the current limiting value I_Lim when the voltage limiting is not performed ($\theta s<\theta st$, or during the returning steering manipulation) at the same motor rotation speed N. Then, the current command value Iref is limited with the current limiting value I_Lim that has been thus set.

That is, the maximum current flowing through the electric motor 13 is the current limiting value I_Lim subjected to the decreasing correction, so that the output of the electric motor 13 can be limited. This allows the assist torque for driver's operation to be limited when the driver steers the steering wheel 1 to the vicinity of the rack end. This can alleviate the impact force transmitted to the torque transmission member, such as an intermediate shaft, at the time of an end contact as the steering limit. Therefore, durability of the steering mechanism can be kept. This further can suppress the driver's uncomfortable feeling during steering manipulation.

Further, since the output from the electric motor 13 is limited by limiting the voltage of the electric motor 13, assist limiting control can be performed by using the motor output characteristics. This can alleviate an impact force at the time of an end contact, while giving natural and smooth steering feeling to the driver without degrading the steering feeling.

Further, as to the voltage limiting of the electric motor 13, the minimum voltage Vmin is set based on the motor output characteristics so as to allow the driver to steer the wheel to the rack end. This can prevent the shortage of a steering assist force in the vicinity of the maximum steering angle $\theta end$, even when the steering angle $\theta s$ becomes the limit starting steering angle $\theta st$ or more and the voltage is limited for the electric motor 13.

Further, the voltage is limited for the electric motor 13 only when the driver manipulates the wheel in an additional steering manner, whereas the voltage is not limited when the driver manipulates the wheel in a returning steering manner. That is, when the steering wheel 1 is returned from the vicinity of the maximum steering angle $\theta end$ to the neutral position, it is possible to prevent the feeling of sticking, which occurs in the vicinity of the maximum steering angle $\theta end$ of the steering wheel 1 due to shortage of the steering assist force, and so good steering feeling can be kept.

(Modification)

Figure 6:
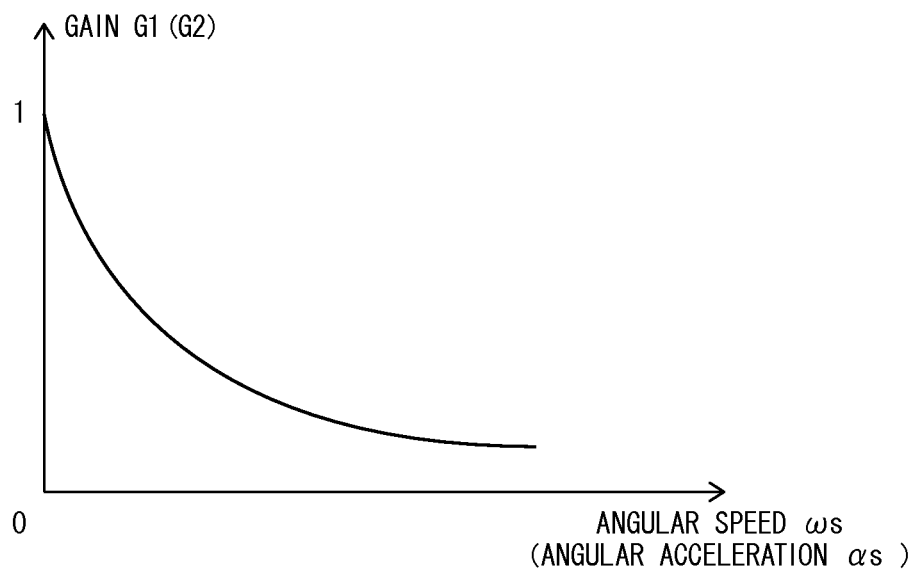
FIG. 6 is an angular speed (angular acceleration) sensitivity gain calculation map.

In the above-stated embodiment, when an additional steering manipulation is performed and $\theta s \geq \theta st$ is satisfied, the voltage target value setting unit 52 may correct the voltage target value Vt set based on the steering angle $\theta s$ with the steering angular speed $\omega s$. In this case, a steering angular speed sensitivity gain G1 is calculated based on the steering angular speed $\omega s$ while referring to the map illustrated in FIG. 6, and the voltage target value Vt set based on the steering angle $\theta s$ is multiplied by the steering angular speed sensitivity gain G1.

Herein, the steering angular speed sensitivity gain G1 is set at a smaller value, as the steering angular speed $\omega s$ is larger. That is, the amount of decreasing correction of the voltage target value Vt is increased, as the steering angular speed $\omega s$ is larger. Accordingly, it is possible to increase the voltage limiting at the high-speed steering and to decrease the voltage limiting at the low-speed steering. Accordingly, the impact force at the time of an end contact at the time of high-speed steering is reduced, and the steering assist force given at the time of low-speed steering can be kept.

The voltage target value Vt may be corrected by using the steering angular acceleration $\alpha s$, instead of the steering angular speed $\omega s$. Also in this case, a steering angular acceleration sensitivity gain G2 is calculated based on the steering angular acceleration $\alpha s$ while referring to the map illustrated in FIG. 6, and the voltage target value Vt set based on the steering angle $\theta s$ is multiplied by the steering angular acceleration sensitivity gain G2. That is, the amount of decreasing correction of the voltage target value Vt increases, as the steering angular acceleration $\alpha s$ is larger. This enables appropriate limiting for sudden switching steering in the vicinity of rack end as well.

Figure 7:
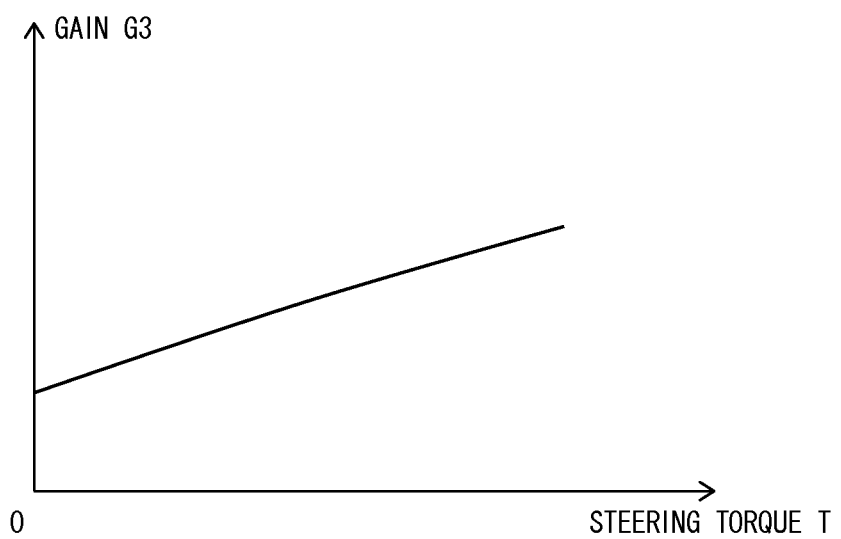
FIG. 7 is a steering torque sensitivity gain calculation map.

The voltage target value Vt may be corrected by using the steering torque T instead of the steering angular speed $\omega s$ or the steering angular acceleration $\alpha s$. In this case, a steering torque sensitivity gain G3 is calculated based on the steering torque T while referring to the map illustrated in FIG. 7, and the voltage target value Vt set based on the steering angle $\theta s$ is multiplied by the steering torque sensitivity gain G3.

Herein, the steering torque sensitivity gain G3 is set at a larger value for a larger steering torque T. That is, the amount of decreasing correction of the voltage target value Vt increases, as the steering torque T is smaller. Hence, it is possible to increase the voltage limiting for the smaller steering force and to decrease the voltage limiting for the larger steering force. Therefore, even if the steering force is small due to the load of the vehicle and the state of the road surface $\mu$, appropriate limiting is performed so that the impact force at the rack end can be reduced.

The above-mentioned correction of the voltage target value Vt based on the steering angular speed $\omega s$, the steering angular acceleration $\alpha s$ and the steering torque T may be combined for use.

Figure 8:
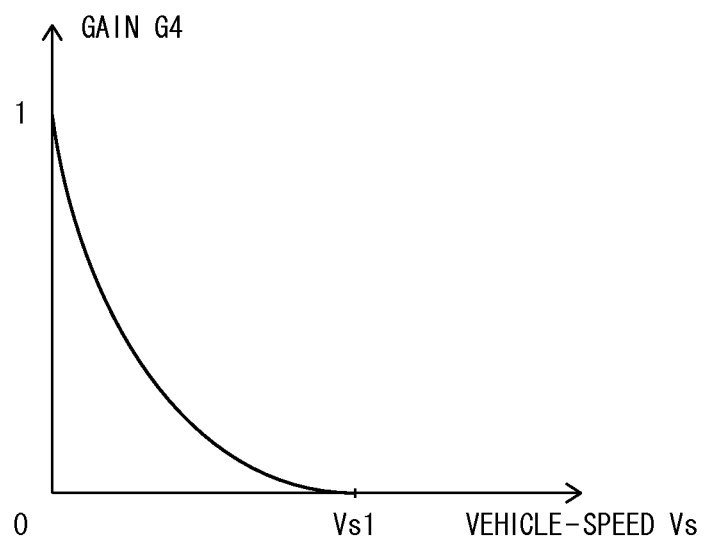
FIG. 8 is a vehicle speed sensitivity gain calculation map.

In the above-mentioned embodiment, the voltage target value setting unit 52 may change the decreasing correction amount in accordance with the vehicle speed Vs. Specifically, as illustrated in FIG. 8, when the vehicle speed Vs falls below a preset high vehicle-speed area determination vehicle speed Vs1, the decreasing correction amount of the voltage target value Vt is gradually decreased with an increase in the vehicle speed Vs, and when the vehicle speed Vs is the high vehicle-speed area determination vehicle speed Vs1 or more, the decreasing correction amount of the voltage target value Vt is set at 0. That is, in the region of Vs<Vs1, the voltage limiting is decreased with an increase in vehicle speed Vs, and in the region of Vs≥Vs1, the voltage limiting is not applied. This can prevent the influence on emergency avoidance or the like.

Figure 9A:
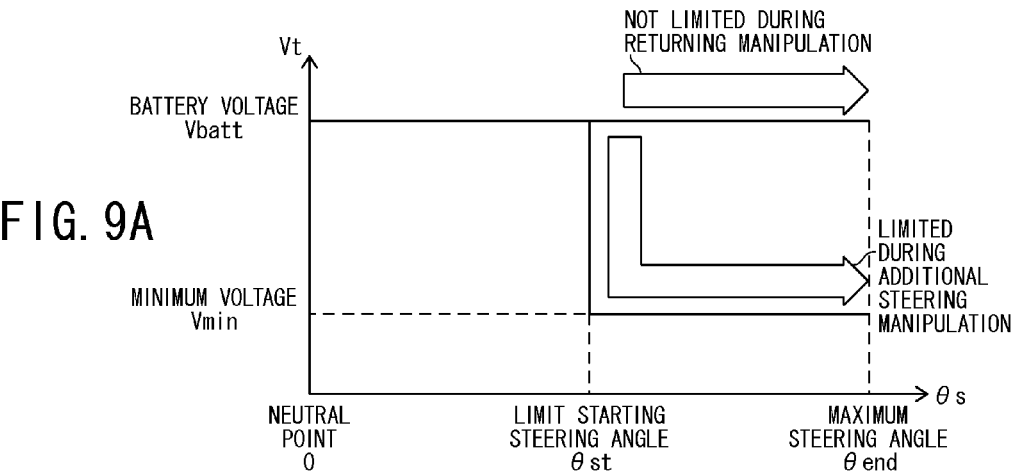
FIG. 9A to FIG. 9C illustrate examples of non-linear change of a voltage target value setting map.
Figure 9B:
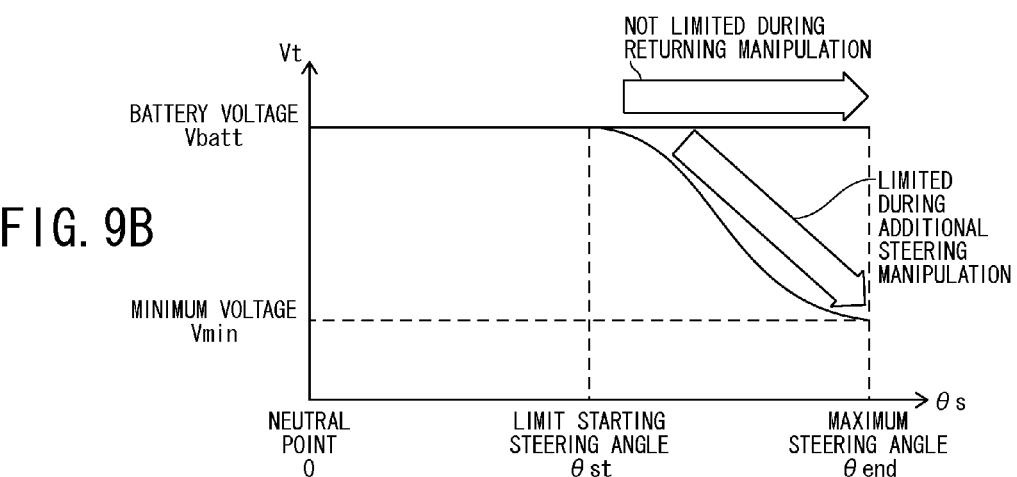
Figure 9C:
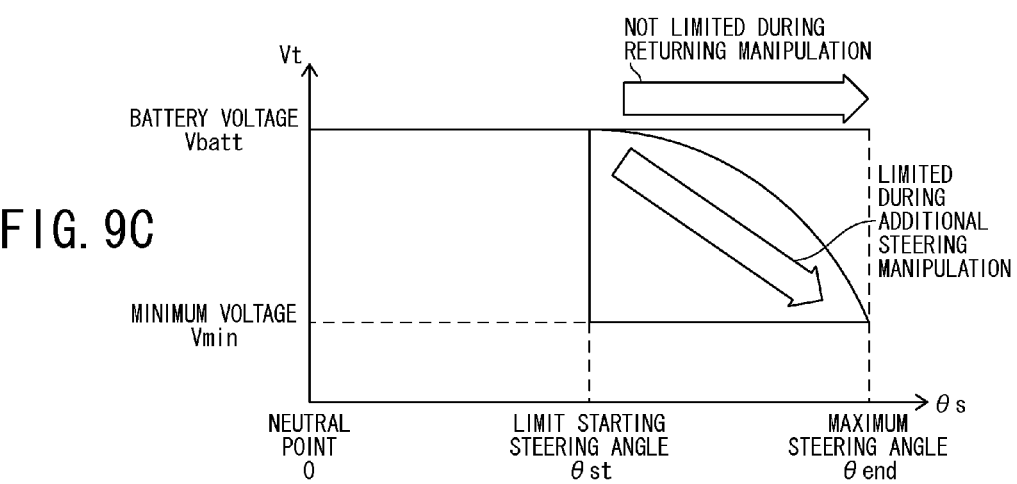

In the above-mentioned embodiment, the voltage target value setting unit 52 sets the voltage target value Vt so that it linearly and gradually decreases from the battery voltage Vbatt to the minimum voltage Vmin with an increase in steering angle θs as illustrated in FIG. 3 during an additional steering manipulation (Flg=1) and in the region where the steering angle θs is the preset limit starting steering angle θst or more. This is not a limiting example, and as illustrated in FIG. 9A, for example, the voltage target value Vt may be set so that it decreases in a step-by-step manner from the battery voltage Vbatt to the minimum voltage Vmin during an additional steering manipulation and in the region where the steering angle θs is the preset limit starting steering angle θst or more. Alternatively as illustrated in FIG. 9B and FIG. 9C, the voltage target value Vt may be set so that it decreases non-linearly from the battery voltage Vbatt to the minimum voltage Vmin with an increase in steering angle θs. The configuration of decreasing to the minimum voltage Vmin with one step as illustrated in FIG. 9A is not a limiting example, and it may be decreased in a step-by-step manner with a plurality of steps.

The entire contents of the Japanese Patent Application No. P2013-206420 (filed on Oct. 1, 2013) in which the priority right of the present patent application is claimed are herein incorporated by reference.

The explanation has been made byway of the limited number of embodiment. The scope of the claims is not limited to the above, and various modifications of the disclosed embodiments will be apparent to those skilled in the art.

REFERENCE SIGNS LIST

1 Steering wheel
2 Steering shaft
3 Steering torque sensor
8 Steering gear
10 Steering assist mechanism
13 Electric motor
14 Controller
15 Battery
16 Ignition switch
17 Vehicle-speed sensor
18 Steering angle sensor
21 Command value calculation unit
22 Command value compensation unit
23 Voltage limiting unit
24 Motor control unit
31 Steering assist command value calculation unit
32 Phase compensation unit
33 Torque differentiation circuit
41 Angular speed calculation unit
42 Angular acceleration calculation unit
43 Convergence compensation unit
44 Inertia compensation unit
45 SAT estimation feedback unit
46 to 48 Adder と
51 Additional steering determination unit
52 Voltage target value setting unit
61 Current command value calculation unit
62 Current command value limiting unit
63 Subtracter
64 Current control unit
65 Motor driving unit

The invention claimed is:

1. An electric power steering apparatus, comprising:
a steering torque detection unit configured to detect steering torque to be input to a steering mechanism;
a current command value calculation unit configured to calculate a current command value based on at least the steering torque detected by the steering torque detection unit;
an electric motor configured to generate steering assist torque to be given to a steering shaft of the steering mechanism;
a motor control unit configured to drive and control the electric motor based on the current command value;
a steering angle detection unit configured to detect a steering angle of a steering wheel;
a voltage target value setting unit configured to set a voltage target value of the electric motor based on the steering angle detected by the steering angle detection unit;
a motor rotation speed detection unit configured to detect a motor rotation speed of the electric motor; and
a current limiting value setting unit configured to set a limiting value of the current command value calculated by the current command value calculation unit by using the voltage target value set by the voltage target value setting unit and the motor rotation speed detected by the motor rotation speed detection unit, based on a motor output characteristic of the electric motor, wherein
the motor control unit is configured to drive and control the electric motor based on the current command value obtained by limiting the current command value calculated by the current command value calculation unit to the limiting value set by the current limiting value setting unit as an upper limit.

2. The electric power steering apparatus according to claim 1, wherein when the steering angle detected by the steering angle detection unit is equal to or larger than a preset limit starting steering angle, the voltage target value setting unit is configured to decrease and correct the voltage target value as compared with a case where the steering angle detected by the steering angle detection unit is smaller than the limit starting steering angle.

3. The electric power steering apparatus according to claim 2, wherein when the steering angle detected by the steering angle detection unit is equal to or larger than the limit starting steering angle, the voltage target value setting unit is configured to decrease and correct the voltage target value from a preset maximum voltage value toward a preset minimum voltage value based on the motor output characteristic, as the steering angle detected by the steering angle detection unit gets closer to a maximum steering angle that is a steering limit angle of the steering wheel.

4. The electric power steering apparatus according to claim 2, further comprising an additional steering manipulation detection unit configured to detect an additional steering manipulation of the steering wheel manipulated by a driver, wherein
when the additional steering manipulation detection unit detects the additional steering manipulation of the steering wheel manipulated by the driver and the steering angle detected by the steering angle detection unit is equal to or larger than the limit starting steering angle, the voltage target value setting unit is configured to decrease and correct the voltage target value as compared with a case where the steering angle detected by the steering angle detection unit is smaller than the limit starting steering angle.

5. The electric power steering apparatus according to claim 2, further comprising a steering angular speed detection unit configured to detect a steering angular speed of the steering wheel, wherein
as the steering angular speed detected by the steering angular speed detection unit is faster, the voltage target value setting unit is configured to increase a decreasing correction amount of decreasing the voltage target value.

6. The electric power steering apparatus according to claim 2, further comprising a steering angular acceleration detection unit configured to detect steering angular acceleration of the steering wheel, wherein
as the steering angular acceleration detected by the steering angular acceleration detection unit is larger, the voltage target value setting unit is configured to increase a decreasing correction amount of decreasing the voltage target value.

7. The electric power steering apparatus according to claim 2, wherein as the steering torque detected by the steering torque detection unit is smaller, the voltage target value setting unit is configured to increase a decreasing correction amount of decreasing the voltage target value.

8. The electric power steering apparatus according to claim 2, further comprising a vehicle-speed detection unit configured to detect a vehicle speed of a vehicle,
wherein when the vehicle speed detected by the vehicle-speed detection unit falls below a preset high vehicle-speed area determination vehicle speed, as the vehicle speed is higher, the voltage target value setting unit is configured to change a decreasing correction amount of decreasing the voltage target value to be smaller, and when the vehicle speed detected by the vehicle-speed detection unit is equal to or higher than the high vehicle-speed area determination vehicle speed, the voltage target value setting unit is configured to change the decreasing correction amount of decreasing the voltage target value to zero.

9. The electric power steering apparatus according to claim 1, wherein the current limiting value setting unit is configured to calculate, from an operating point on a motor output characteristic line obtained by setting the voltage value of the electric motor constant at the voltage target value set by the voltage target value setting unit, a motor current value when the motor rotation speed equals the motor rotation speed detected by the motor rotation speed detection unit, and to set the motor current value that has been calculated as a limiting value of the current command value.

* * * * *